R. L. McALISTER.
DRENCHING BIT FOR ANIMALS.
APPLICATION FILED FEB. 10, 1919.
1,311,409.
Patented July 29, 1919.
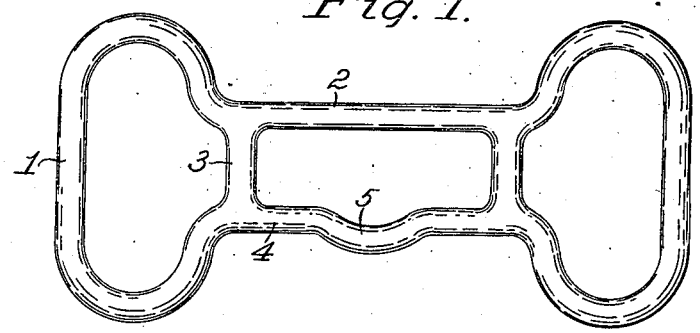
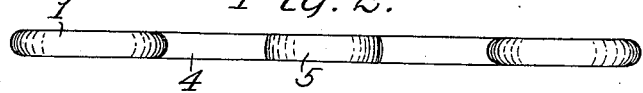
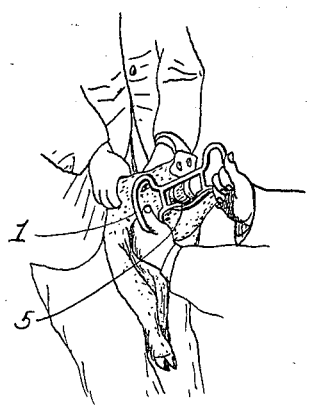
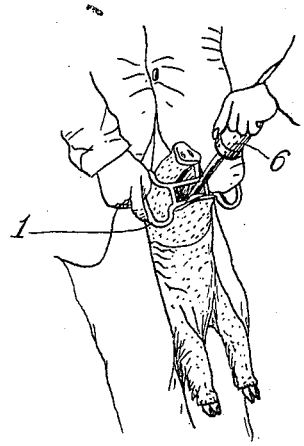
Inventor,
R. L. McAlister, by
G. C. Kennedy,
Attorney.

UNITED STATES PATENT OFFICE.

ROBERT L. McALISTER, OF SHENANDOAH, IOWA, ASSIGNOR TO SHORES-MUELLER COMPANY, OF CEDAR RAPIDS, IOWA.

DRENCHING-BIT FOR ANIMALS.

1,311,409.      Specification of Letters Patent.      Patented July 29, 1919.

Application filed February 10, 1919. Serial No. 276,130.

*To all whom it may concern:*

Be it known that I, ROBERT L. MCALISTER, a citizen of the United States of America, and a resident of Shenandoah, Page county, Iowa, have invented certain new and useful Improvements in Drenching-Bits for Animals, of which the following is a specification.

My invention relates to improvements in drenching bits for animals, and the object of my improvement is to supply a bit for manual use in administering medicine or drenches to hogs or other animals, and which is so formed as to hold the tongue and jaws of the animal in proper positions for such administration.

This object I have accomplished by the means which are hereinafter described and claimed, and which are illustrated in the accompanying drawings, in which Figures 1 and 2 are respectively plan and edge views of my improved drenching bit; and Figs. 3 and 4 are illustrations showing two different stages in the use of said appliance.

Similar numerals of reference denote corresponding parts throughout the several views.

My improved drenching bit is preferably a single piece casting. Its middle portion is composed of rectangularly arranged parts or bars 2 and 3, of which one of the longer and longitudinal bars 4 has its middle curved outwardly at 5 in the plane of the device. The outer opposite ends of the bit are formed in widened like loops or handholds 1.

The cross-bars 3 may be omitted, but, structurally, strengthen the bit and while supporting parallel parts 2 and 4, thus prevent their collapse under strains incidental to their use.

The method of employment of the device is illustrated in said Figs. 3 and 4. In Fig. 3, is shown a hog firmly grasped by one person while another person properly locates the bit between the distended jaws of the animal, with the curved part 5 in contact with the animal's tongue. The next stage of manipulation is shown in Fig. 4, wherein the bit is shown partially rotated, causing its curved part 5 to drag the animal's tongue outwardly so as to leave the throat opening clear for the reception of a drench or medicine applied through an intruded syringe 6.

Having described my invention, what I claim as new, and desire to secure by Letters Patent, is:

1. A drenching bit for animals, consisting of spaced bars integrally connected by cross-bars, one of the cross-bars being straight and having an outwardly directed medial projection.

2. A drenching bit for animals, consisting of spaced straight bars integrally connected by cross-bars, one of the cross-bars having an outwardly directed convex medial part, and laterally looped bars at opposite ends for handles.

3. A drenching bit for animals, comprising a hollow rectangular body having on one side a projecting portion extended therebeyond adapted for engaging, compressing and holding the tongue of an animal between and below the level of its jaws.

4. A drenching bit for animals, comprising a pair of parallel bars connected by terminal loops, and also intermediately connected by spaced cross-bars.

Signed at Shenandoah, Iowa, this 21st day of October, 1918.

ROBERT L. McALISTER.

Copies of this patent may be obtained for five cents each, by addressing the "Commissioner of Patents, Washington, D. C."